(12) United States Patent
Vyas et al.

(10) Patent No.: US 9,787,589 B2
(45) Date of Patent: Oct. 10, 2017

(54) FILTERING OF UNSOLICITED INCOMING PACKETS TO ELECTRONIC DEVICES

(71) Applicant: Apple Inc., Cupertino, CA (US)

(72) Inventors: Amit K. Vyas, San Jose, CA (US); Ray L. Chang, Sunnyvale, CA (US); Matthew W. Massicotte, Quincy, MA (US); Madhusudan Chaudhary, Campbell, CA (US); Cherif Jazra, Los Altos, CA (US); Tong Liu, San Diego, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 13/627,888

(22) Filed: Sep. 26, 2012

(65) Prior Publication Data

US 2013/0329732 A1 Dec. 12, 2013

Related U.S. Application Data

(60) Provisional application No. 61/657,525, filed on Jun. 8, 2012.

(51) Int. Cl.
*H04L 12/741* (2013.01)
*H04L 29/06* (2006.01)

(52) U.S. Cl.
CPC ........... *H04L 45/745* (2013.01); *H04L 63/02* (2013.01); *H04L 63/0227* (2013.01)

(58) Field of Classification Search
CPC .... H04L 45/745; H04L 63/0227; H04L 63/02
See application file for complete search history.

(56) References Cited

U.S. PATENT DOCUMENTS

| 6,728,885 B1 * | 4/2004 | Taylor ............... H04L 63/0263 |
| | | 709/238 |
| 2006/0109846 A1 | 5/2006 | Lioy et al. |
| 2009/0006595 A1 | 1/2009 | Abzarian et al. |
| 2009/0232039 A1 | 9/2009 | Jung |

(Continued)

OTHER PUBLICATIONS

Final Office Action mailed Sep. 9, 2014 for U.S. Appl. No. 13/627,898, filed Sep. 26, 2012; 27 pages.

(Continued)

*Primary Examiner* — Ian N Moore
*Assistant Examiner* — Justin T Van Roie
(74) *Attorney, Agent, or Firm* — Sterne, Kessler, Goldstein & Fox, PLLC

(57) ABSTRACT

The disclosed embodiments provide a system that processes incoming network packets to an electronic device. The system includes an analysis apparatus that maintains a list of accepted incoming packet attributes for the electronic device based on outgoing packets from the electronic device. The system also includes a filtering apparatus that compares a first set of header information for an incoming packet to the list. If the first set of header information is not included in the list, the filtering apparatus discards the incoming packet. If the first set of header information is included in the list, the filtering apparatus enables subsequent processing of the incoming packet on the electronic device by, for example, providing the incoming packet to a transport-layer mechanism on the electronic device for subsequent processing of the incoming packet by the transport-layer mechanism.

28 Claims, 5 Drawing Sheets

(56) References Cited

U.S. PATENT DOCUMENTS

2010/0293400 A1* 11/2010 Kuroishi et al. ............. 713/310
2010/0323675 A1 12/2010 Hawkins
2011/0016519 A1* 1/2011 Sauter et al. .................. 726/13
2011/0019600 A1* 1/2011 Ping ...................... G06F 1/3203
　　　　　　　　　　　　　　　　　　　　　　　　　　370/311
2013/0329615 A1 12/2013 Vyas et al.

OTHER PUBLICATIONS

Non-Final Office Action mailed May 7, 2014 for U.S. Appl. No. 13/627,898, filed Sep. 26, 2012; 24 pages.

* cited by examiner

FILTERING OF UNSOLICITED INCOMING PACKETS TO ELECTRONIC DEVICES

RELATED APPLICATION

This application claims priority under 35 U.S.C. §119(e) to U.S. Provisional Application Ser. No. 61/657,525, entitled "Filtering of Unsolicited Incoming Packets to Electronic Devices," by Amit K. Vyas, Ray L. Chang, Matthew W. Massicotte, Madhusudan Chaudhary, Cherif Jazra and Tong Liu, filed on Jun. 8, 2012, the contents of which is herein incorporated by reference.

The subject matter of this application is related to the subject matter in a co-pending non-provisional application by the same inventors as the instant application and filed on the same day as the instant application, entitled "Adjusting Radio Dormancies in Electronic Devices Based on Receipt of Unsolicited Incoming Packets," having Ser. No. 13/627,898, and filing date Sept. 26, 2012.

BACKGROUND

Field

The disclosed embodiments relate to processing of network packets. More specifically, the disclosed embodiments relate to techniques for filtering unsolicited incoming packets to an electronic device using a list of accepted incoming packet attributes for the electronic device.

Related Art

Recent improvements in computing power and wireless networking technology have significantly increased the capabilities of electronic devices. For example, laptop computers, tablet computers, portable media players, smartphones, digital media receivers, video game consoles, and/or other modern computing devices are typically equipped with WiFi capabilities that allow the computing devices to retrieve webpages, stream audio and/or video, share desktops and/or user interfaces (UIs), and/or transfer files wirelessly among one another.

To provide such wireless networking capabilities, each electronic device may include a wireless network interface such as a WiFi interface, a cellular network interface, and/or a Bluetooth (Bluetooth™ is a registered trademark of Bluetooth SIG, Inc.) interface. The electronic device may also include a baseband processor and an application processor that implement a network stack on the electronic device. For example, the baseband processor may relay incoming packets from the wireless network interface to the application processor, and the application processor may route the incoming packets to applications on the electronic device. Conversely, the application processor may obtain outgoing packets from the applications and provide the outgoing packets to the baseband processor, and the baseband processor may format the outgoing packets and transmit the outgoing packets over the wireless network interface.

During a sleep mode on the electronic device, the application processor may be powered down, while the baseband processor may remain powered on to detect incoming packets over the wireless network interface and wake the application processor once the incoming packets are received. An unsolicited incoming packet such as a ping packet may thus wake up the application processor, only to be discarded by the application processor because no application on the electronic device is listening for the unsolicited incoming packet. Unsolicited incoming packets may also be sent as malicious attacks from other electronic devices to exploit security vulnerabilities in software executing on the application processor. Consequently, the operation and/or use of electronic devices may be adversely impacted by the processing of unsolicited incoming packets on the electronic devices.

SUMMARY

The disclosed embodiments provide a system that processes incoming network packets to an electronic device. The system includes an analysis apparatus that maintains a list of accepted incoming packet attributes for the electronic device based on outgoing packets from the electronic device. The system also includes a filtering apparatus that compares a first set of header information for an incoming packet to the list. If the first set of header information is not included in the list, the filtering apparatus discards the incoming packet. If the first set of header information is included in the list, the filtering apparatus enables subsequent processing of the incoming packet on the electronic device by, for example, providing the incoming packet to a transport-layer mechanism on the electronic device for subsequent processing of the incoming packet by the transport-layer mechanism.

In some embodiments, the analysis apparatus also maintain the list based on a set of services associated with the incoming packets on the electronic device. For example, the services may listen for incoming packets associated with specific ports and/or Internet Protocol (IP) addresses and/or ranges of port numbers and/or IP addresses. To enable receipt of the incoming packets by the services, the analysis apparatus may obtain the IP addresses and/or ports from the services and add the IP addresses and/or ports to the list.

In some embodiments, the analysis apparatus also provides the list to the filtering apparatus for subsequent use in filtering incoming packets to the electronic device. For example, the analysis apparatus may provide the list to the filtering apparatus prior to entering a sleep mode on the electronic device, and the filtering apparatus may use the list to prevent an unsolicited incoming packet from triggering an exit from the sleep mode. Alternatively, the analysis apparatus may enable access to the list by the filtering apparatus while the list is maintained based on the outgoing packets, thus allowing the filtering apparatus to filter incoming packets during both sleep and wake modes on the electronic device.

In some embodiments, maintaining the list based on the outgoing packets includes:
  (i) analyzing a second set of header information for an outgoing packet from the electronic device;
  (ii) adding the second set of header information as one or more accepted incoming packet attributes to the list if the second set of header information is associated with a new socket pair; and
  (iii) removing the second set of header information from the list if the header information is associated with a closed socket pair.

In some embodiments, the new socket pair is associated with a new Transmission Control Protocol (TCP) connection and/or a new User Datagram Protocol (UDP) port, and the closed socket pair is associated with a closed TCP connection, a protocol timeout, and/or a protocol reset.

In some embodiments, the header information is associated with an Internet Protocol (IP) header and/or a transport protocol header.

In some embodiments, the list includes at least one of a protocol, a source network address, a source port, a destination network address, and a destination port.

BRIEF DESCRIPTION OF THE FIGURES

In the figures, like reference numerals refer to the same figure elements.

DETAILED DESCRIPTION

Figure 1:
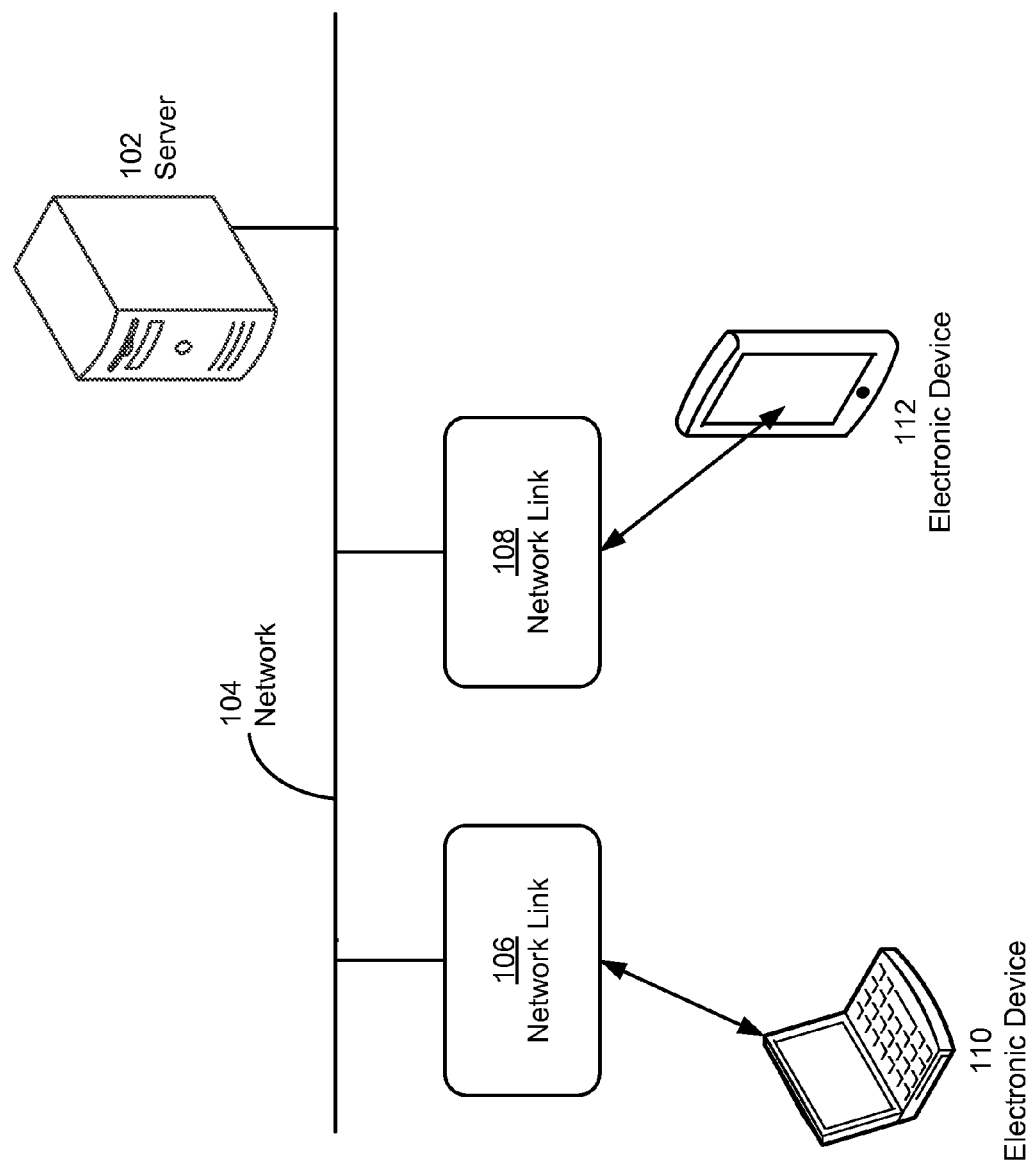
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in this detailed description can be included in hardware modules. For example, the hardware modules can include, but are not limited to, processing subsystems, microprocessors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of the embodiments.

The disclosed embodiments provide a method and system for processing network packets. As shown in FIG. 1, a number of electronic devices 110-112 are connected to a network 104 through network links 106-108 provided by devices such as wireless access points, cell towers, and/or routers. Electronic devices 110-112 may correspond to personal computers, laptop computers, tablet computers, mobile phones, portable media players, and/or other network-enabled electronic devices. Network 104 may include a local area network (LAN), wide area network (WAN), personal area network (PAN), virtual private network, intranet, mobile phone network (e.g., a cellular network), WiFi network, Bluetooth network, universal serial bus (USB) network, Ethernet network, an ad hoc network formed between two or more devices, and/or other type of network that facilitates communication among electronic devices (e.g., electronic devices 110-112) connected to network 104.

In particular, electronic devices 110-112 may interact with one another and/or a server 102 on network 104 by sending and receiving data such as files, audio, video, and/or web content over network 104. For example, electronic device 110 may request data from electronic device 112 and server 102 by establishing Transmission Control Protocol (TCP) connections with electronic device 112 and server 102. Electronic device 112 and server 102 may provide the requested data by transmitting a sequence of packets containing the data over network 104 to electronic device 110. At the same time, electronic devices 110-112 and/or other electronic devices (not shown) may communicate with one another, server 102, and/or other servers (not shown) on network 104 by transmitting and receiving packets over network 104.

When electronic devices 110-112 are not actively communicating over network 104 and/or performing tasks for users of electronic devices 110-112, electronic devices 110-112 may enter a sleep (e.g., standby) mode, during which a number of components in electronic devices 110-112 are powered down to save power. Electronic devices 110-112 may then exit the sleep mode if user input and/or incoming network packets (e.g., from network 104) are received on electronic devices 110-112.

However, unsolicited incoming network packets to electronic devices 110-112 may waste power on electronic devices 110-112 and/or present a security risk to electronic devices 110-112. For example, an electronic device (e.g., electronic devices 110-112) may include an application processor that is powered down during the sleep mode and a baseband processor that remains on during the sleep mode to monitor a wireless network interface with a network link (e.g., network links 106-108) for incoming packets to the electronic device. An incoming packet received by the baseband processor over the wireless network interface may trigger an exit from the sleep mode (e.g., a wake sequence) to enable processing of the incoming packet by the application processor. The application processor may then initialize drivers, schedule processes, and/or perform other tasks associated with the wake sequence before processing the incoming packet. Moreover, the application processor may discard the incoming packet if no application on the electronic device is listening for the incoming packet, resulting in unnecessary power consumption and a lack of useful work on the electronic device. The presence of the incoming packet in the application processor may further expose the operating system and/or applications on the electronic device to a malicious attack by another electronic device from which the incoming packet was received.

Figure 2:
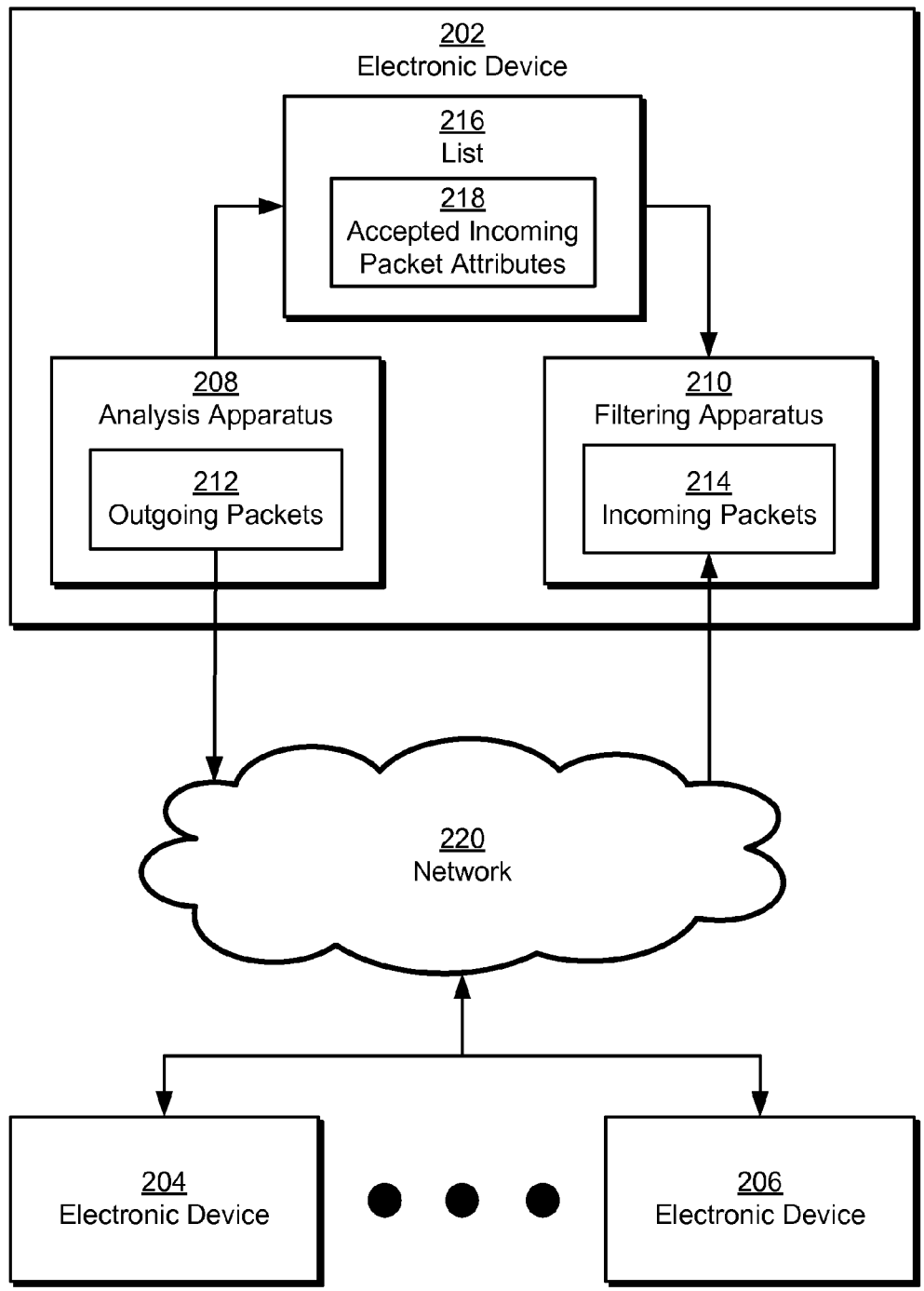
FIG. 2 shows a system for processing packets on an electronic device in accordance with the disclosed embodiments.

In one or more embodiments, electronic devices 110-112 include functionality to filter incoming packets so that unsolicited incoming packets are discarded before the unsolicited incoming packets can negatively impact the power consumption and/or security of electronic devices 110-112. As shown in FIG. 2, a set of electronic devices 202-206 (e.g., personal computers, laptop computers, mobile phones, tablet computers, portable media players, servers, etc.) may be connected to one another through a network 220. In addition, electronic device 202 may communicate with electronic devices 204-206 by receiving incoming packets 214 from electronic devices 204-206 and sending outgoing packets 212 to electronic devices 204-206 over network 220.

Such networking capabilities on electronic device 202 may be provided by one or more components (e.g., processor cores, baseband processor, application processor, etc.) that implement a network stack on electronic device 202. For example, a baseband processor on electronic device 202 may manage the physical and/or data link layers of the network stack, an application processor on electronic device 202 may manage the transport and/or application layers of the network stack, and either the baseband or application processors may manage the network layer of the network stack.

As shown in FIG. 2, one or more components of electronic device 202 may also provide an analysis apparatus 208 and/or a filtering apparatus 210. Analysis apparatus 208 may maintain a list 216 of accepted incoming packet attributes 218 for electronic device 202 based on outgoing packets 212 (e.g., Internet Protocol (IP) packets) from electronic device 202. Filtering apparatus 210 may use list 216 in filtering incoming packets 214 to electronic device 202 by discarding a subset of incoming packets 214 (e.g., Internet Protocol (IP) packets) that do not include one or more of accepted incoming packet attributes 218.

In particular, analysis apparatus 208 may maintain list 216 based on a set of services associated with incoming packets 214 to electronic device 202. The services may utilize incoming packets associated with certain attributes to perform tasks on electronic device 202. For example, the services may obtain data from electronic devices 204-206, process the data on electronic device 202, and/or provide the data to a user of electronic device 202. In addition, the data may be sent using incoming packets 214 from specific ports and/or IP addresses and/or ranges of port numbers and/or IP addresses. To enable use of the incoming packets by the services, analysis apparatus 208 may obtain the IP addresses and/or ports from the services and add the IP addresses and/or ports as accepted incoming packet attributes 218 to list 216, and filtering apparatus 210 may allow packets that match the IP addresses and/or ports to reach the services. Such inclusion of accepted incoming packet attributes 218 associated with services on electronic device 202 may allow the services to act as listeners for connections and/or communications initiated by electronic devices 204-206.

Analysis apparatus 208 may also actively update list 216 by analyzing header information for each outgoing packet (e.g., outgoing packets 212) from electronic device 202. The header information may be obtained from one or more protocol headers in the outgoing packet. For example, the header information may include source and destination network (e.g., IP) addresses, source and destination ports, protocols, flags, and/or other information from the IP, Transmission Control Protocol (TCP), and/or User Datagram Protocol (UDP) headers in the outgoing packet.

If the header information is associated with a new socket pair, analysis apparatus 208 may add the header information as one or more accepted incoming packet attributes to list 216. If the header information is associated with a closed socket pair, analysis apparatus 208 may remove the header information from list 216. If the header information is not associated with either the new socket pair or the closed socket pair, analysis apparatus 208 may not modify list 216 based on the header information.

For example, the header information may specify either TCP or UDP as the transport protocol for the outgoing packet. Because TCP tracks connections and/or states while UDP is connectionless and/or stateless, analysis apparatus 208 may process the header information differently based on the use of either TCP or UDP as the outgoing packet's transport protocol. Analysis apparatus 208 may also maintain separate lists of accepted incoming packet attributes 218 for TCP and UDP communications, or analysis apparatus 208 may maintain a common list 216 for both protocols and specify the transport protocol used with each entry in list 216.

If TCP is the transport protocol for the outgoing packet, analysis apparatus 208 may examine the outgoing packet's TCP header to determine if electronic device 202 is making a new TCP connection or closing an existing TCP connection. The new TCP connection may be made by electronic device 202 if the outgoing packet includes a SYN and a new sequence number, while the existing TCP connection may be closed by electronic device 202 if the outgoing packet includes a FIN. If a new TCP connection is being made using the outgoing packet, analysis apparatus 208 may add the source and destination ports and source and destination IP addresses from the outgoing packet as a new entry to list 216. If an existing TCP connection is being closed by the outgoing packet, analysis apparatus 208 may remove the entry containing the source and destination ports and source and destination IP addresses in the outgoing packet's headers from list 216. Finally, if analysis apparatus 208 determines that the outgoing packet is not used to create or close a TCP connection, analysis apparatus 208 may stop analyzing the remaining header information from the outgoing packet and begin analyzing header information from the next outgoing packet to reduce overhead associated with maintaining list 216 based on outgoing packets 212.

If UDP is the transport protocol for the outgoing packet, analysis apparatus 208 may compare the source and destination ports and source and destination IP addresses of the outgoing packet with accepted incoming packet attributes 218 in list 216. If the source and destination ports and source and destination IP addresses of the outgoing packet are not in list 216, the outgoing packet may specify a new socket pair, and analysis apparatus 208 may add the new socket pair to list 216. If the source and destination ports and IP addresses are already in list 216, analysis apparatus 208 may omit modifications based on the outgoing packet to list 216.

Finally, analysis apparatus 208 may remove a socket pair from list 216 if the socket pair has not been seen in outgoing packets 214 for a pre-specified period (e.g., indicating a protocol timeout) and/or the outgoing packet is a reset packet that includes the socket pair (e.g., indicating the closing of a port associated with the socket pair).

Once list 216 is available to filtering apparatus 210, filtering apparatus 210 may use list 216 to filter incoming packets 214 by discarding incoming packets that do not include one or more accepted incoming packet attributes 218. For example, filtering apparatus 210 may discard all incoming packets that are not associated with ports used by services on electronic device 202 or socket pairs used by existing TCP connections and/or UDP communications on electronic device 202. Filtering apparatus 210 may also discard incoming packets associated with the Internet Control Message Protocol (ICMP) (e.g., ping packets) and/or incoming packets that are otherwise classified as unsolicited incoming packets by analysis apparatus 208. Finally, filtering apparatus 210 may enable subsequent processing of incoming packets that match accepted incoming packet attributes 218 in list 216 by, for example, providing the incoming packets to a transport-layer mechanism that manages the transport layer of the network stack on electronic device 202. The transport-layer mechanism may then route the incoming packets to applications on electronic device 202 so that the applications may use the data in the incoming packets to perform tasks for the user of electronic device 202.

In addition, filtering apparatus 210 may perform filtering of incoming packets 214 at various times. For example, an application processor implementing analysis apparatus 208 may use a Universal Serial Bus (USB) interface, a Universal Asynchronous Receiver/Transmitter (UART), and/or shared memory to provide list 216 to a baseband processor implementing filtering apparatus 210 prior to entering a sleep mode on electronic device 202. During the sleep mode, the baseband processor may use list 216 to prevent an unsolicited incoming packet from triggering an unnecessary exit from the sleep mode. Alternatively, analysis apparatus 208 may be implemented by either the application or baseband processors, and filtering apparatus 210 may be implemented by the baseband processor. Filtering apparatus 210 may also have access to list 216 while list 216 is being updated by analysis apparatus 208, thus enabling the filtering of incoming packets 214 during both sleep and wake modes on electronic device 202.

By providing a system that identifies and discards unsolicited incoming packets before the unsolicited incoming packets pass through the network stack on electronic device 202, analysis apparatus 208 and filtering apparatus 210 may reduce unnecessary processing of the unsolicited incoming packets and mitigate security risks associated with accepting the unsolicited incoming packets on electronic device 202. Such discarding of unsolicited incoming packets may further reduce the power consumption of electronic device 202 by preventing the unsolicited incoming packets from needlessly triggering exits from sleep modes on electronic device 202.

Those skilled in the art will appreciate that the system of FIG. 2 may be implemented in a variety of ways. First, as described above, analysis apparatus 208 and filtering apparatus 210 may be provided by the same software and/or hardware component, or analysis apparatus 208 and filtering apparatus 210 may execute independently from one another. For example, analysis apparatus 208 and filtering apparatus 210 may be implemented using different combinations of an application processor, a baseband processor, a multi-core processor, a single-core processor, an operating system kernel, a standalone application, and/or a driver.

Second, analysis apparatus 208 and filtering apparatus 210 may use a number of techniques to manage and share list 216. For example, analysis apparatus 208 and filtering apparatus 210 may access list 216 concurrently, thus enabling filtering of incoming packets 214 during both sleep and wake modes, or analysis apparatus 208 may provide list 216 to filtering apparatus 210 before electronic device 202 enters the sleep mode to enable filtering of incoming packets 214 while electronic device 202 is asleep. Similarly, analysis apparatus 208 may store different types of accepted incoming packet attributes 218 (e.g., port numbers, network addresses, protocols, etc.) in one or more lists (e.g., list 216) for filtering incoming packets 214, and may also maintain a list of rejected incoming packet attributes to facilitate the automatic discarding of certain types of incoming packets (e.g., ping packets) by filtering apparatus 210.

Finally, analysis apparatus 208 and filtering apparatus 210 may process incoming packets 214 from a variety of network connections. For example, analysis apparatus 208 may create list 216 based on outgoing packets 212 transmitted over a cellular network connection, WiFi connection, Bluetooth (Bluetooth™ is a registered trademark of Bluetooth SIG, Inc.) connection, wired network connection, and/or other type of network connection. Filtering apparatus 210 may then use list 216 to filter incoming packets 214 from the same type of network connection.

Figure 3:
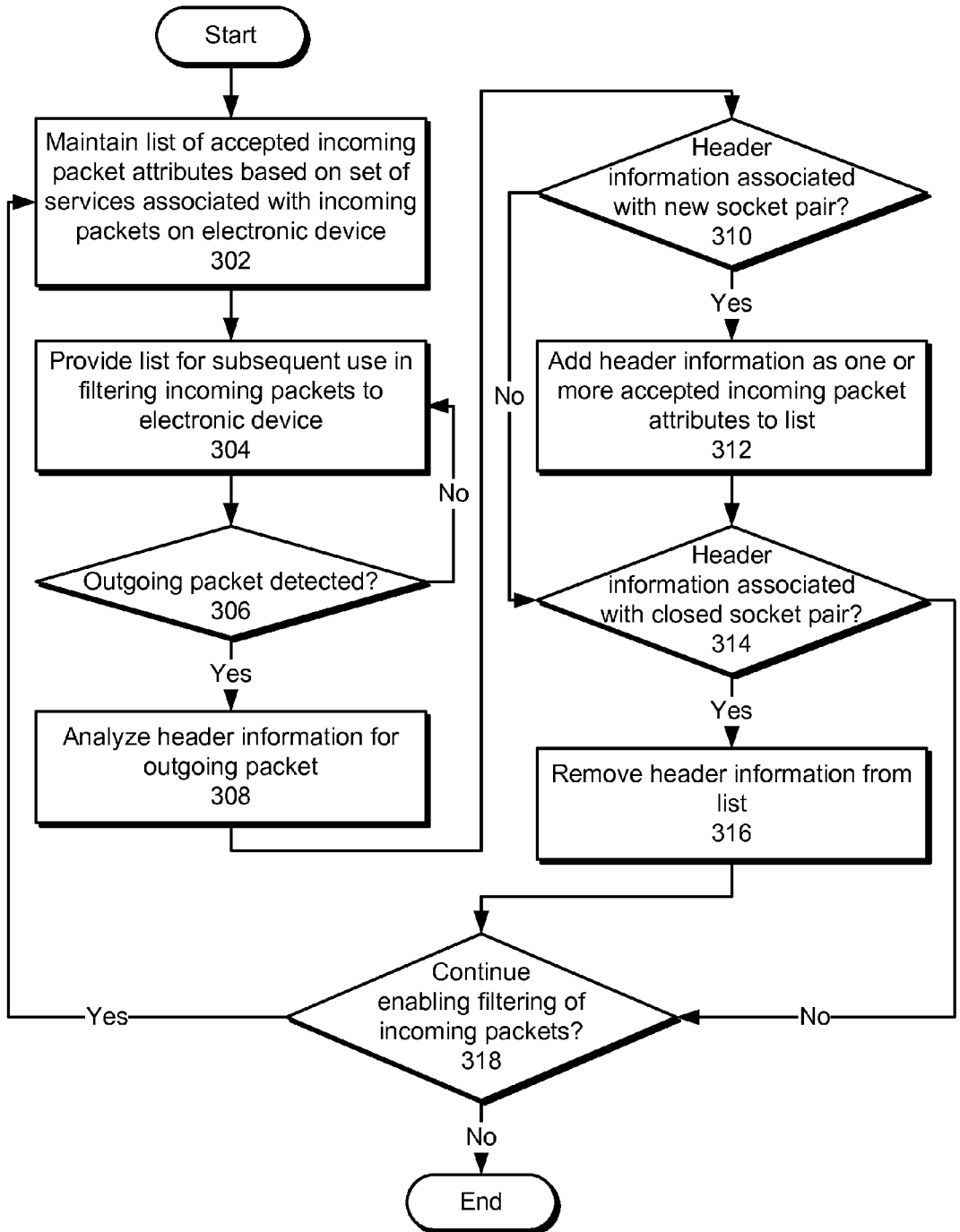
FIG. 3 shows a flowchart illustrating the process of facilitating the processing of incoming network packets to an electronic device in accordance with the disclosed embodiments.

FIG. 3 shows a flowchart illustrating the process of facilitating the processing of incoming network packets to an electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a list of accepted incoming packet attributes is maintained based on a set of services associated with the incoming packets on the electronic device (operation 302). The accepted incoming packet attributes may include protocols, network addresses, and/or ports used to transmit data over a network to the services. For example, the accepted incoming packet attributes may include a port that is used by a listening service on the electronic device to receive incoming packets from a server on the network.

Next, the list is provided for subsequent use in filtering incoming packets to the electronic device (operation 304). For example, the list may be provided a filtering apparatus prior to entering a sleep mode on the electronic device, and the filtering apparatus may use the list to prevent an unsolicited incoming packet from triggering an exit from the sleep mode. Alternatively, access to the list by the filtering apparatus may be enabled while the list is maintained based on the outgoing packets, thus allowing the filtering apparatus to filter incoming packets during both sleep and wake modes on the electronic device. Filtering of incoming packets using lists of accepted incoming packet attributes is discussed in further detail below with respect to FIG. 4.

An outgoing packet from the electronic device may be detected (operation 306). If no outgoing packets from the electronic device are detected, the list may continue to be provided for use in filtering incoming packets to the electronic device (operation 304) without modification. If an outgoing packet (e.g., an IP packet) is detected, header information for the outgoing packet is analyzed (operation 308). The header information may be associated with an IP header and/or a transport protocol (e.g., TCP, UDP, etc.) header in the outgoing packet.

The header information may also be associated with a new socket pair (operation 310). For example, the header information may be associated with a new socket pair if the header information specifies a new TCP connection (e.g., SYN) and/or a new UDP port. If the header information is associated with the new socket pair, the header information is added as one or more accepted incoming packet attributes to the list (operation 312). For example, the list may be updated with a single entry containing the protocol (e.g., TCP, UDP, etc.), source network address, source port, destination network address, and/or destination port from the header information.

If the header information is not associated with a new socket pair, the header information may be associated with a closed socket pair (operation 314). For example, the header information may be associated with a closed socket pair if the header information indicates a closed TCP connection (e.g., FIN), a protocol timeout (e.g., a lack of outgoing packets associated with the socket pair for a pre-specified period), and/or a protocol reset (e.g., a reset packet). If the header information is associated with the closed socket pair, the header information is removed from the list (operation 316). If the header information is associated with neither the new socket pair nor the closed socket pair, the header information is not used to modify the list.

Filtering of incoming packets may continue to be enabled (operation 318) by the list. If enabling the filtering of packets is to be continued, the list is maintained based on services associated with the incoming packets (operation 302), provided for use in filtering the incoming packets (operation 304), and updated based on outgoing packets from the electronic device (operations 306-316). Such processing of the list may continue until filtering of incoming packets to the electronic device is disabled, the electronic device enters the sleep mode, and/or incoming packets are no longer received by the electronic device.

Figure 4:
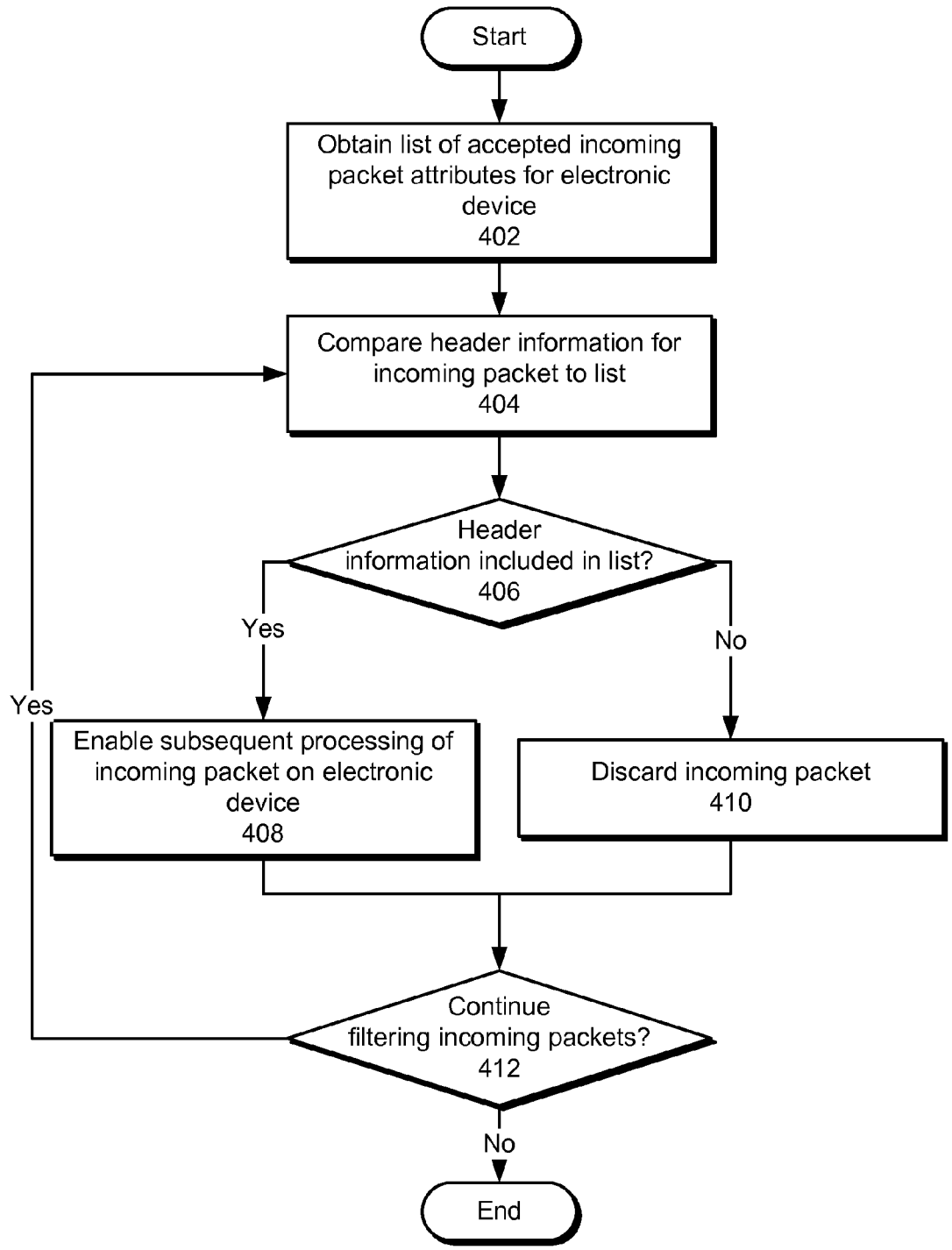
FIG. 4 shows a flowchart illustrating the processing of incoming network packets to an electronic device in accordance with the disclosed embodiments.

FIG. 4 shows a flowchart illustrating the processing of incoming network packets to an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, a list of accepted incoming packet attributes for the electronic device is obtained (operation 402). The list may be obtained while the list is maintained based on outgoing packets from the electronic device, as discussed above with respect to FIG. 3, or prior to entering a sleep mode on the electronic device. Next, header information for an incoming packet (e.g., an IP packet) is compared to the list (operation 404) to determine if the header information is included in the list (operation 406). For example, the list may be examined for an entry containing the protocol, source network address, source port, destination network address, and/or destination port from the header information.

If the header information is included in the list, subsequent processing of the incoming packet on the electronic device is enabled (operation 408). For example, the incoming packet may be provided to a transport-layer mechanism that manages the transport layer of a network stack on the electronic device for subsequent processing of the incoming packet by the transport-layer mechanism and/or an application on the electronic device.

Conversely, if the header information is not included in the list, the incoming packet may be classified as an unsolicited incoming packet and discarded (operation 410) to preclude further processing of the packet on the electronic device. Such discarding of the incoming packet may reduce the processing overhead and/or power consumption of the electronic device. For example, the incoming packet may be discarded before the incoming packet is processed further by one or more layers of the network stack and/or triggers an exit from a sleep mode on the electronic device. Discarding of the incoming packet before the incoming packet reaches the upper layers of the network stack may further reduce the security risk associated with a malicious attack by a sender of the incoming packet.

Filtering of incoming packets may continue (operation 412). If filtering of the incoming packets is to continue, header information for each incoming packet is compared to the list (operation 404), and the incoming packet is handled based on the comparison (operations 408-410). Such filtering may continue until the electronic device is switched off, filtering of incoming packets to the electronic device is disabled, and/or incoming packets are no longer received by the electronic device.

Figure 5:
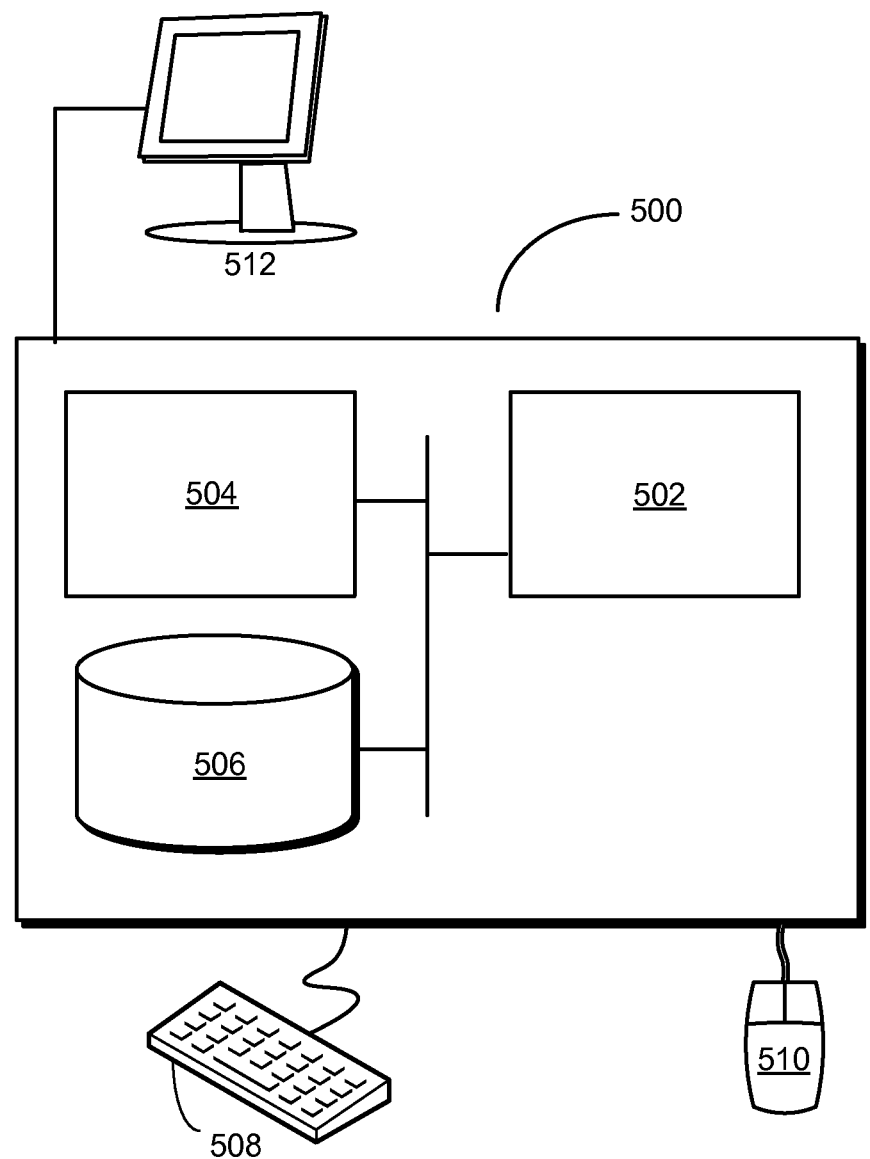
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the processing of incoming network packets to an electronic device. The system may include an analysis apparatus that maintains a list of accepted incoming packet attributes for the electronic device based on outgoing packets from the electronic device. The system may also include a filtering apparatus that compares a first set of header information for an incoming packet to the list. If the first set of header information is not included in the list, the filtering apparatus may discard the incoming packet. If the first set of header information is included in the list, the filtering apparatus may enable subsequent processing of the incoming packet on the electronic device by, for example, providing the incoming packet to a transport-layer mechanism on the electronic device for subsequent processing of the incoming packet by the transport-layer mechanism.

To maintain the list of accepted incoming packet attributes, the analysis apparatus may analyze a second set of header information for an outgoing packet from the electronic device. The analysis apparatus may add the second set of header information as one or more accepted incoming packet attributes to the list if the second set of header information is associated with a new socket pair. On the other hand, the analysis apparatus may remove the second set of header information from the list if the header information is associated with a closed socket pair.

In addition, one or more components of computer system 500 may be remotely located and connected to the other components over a network. Portions of the present embodiments (e.g., analysis apparatus, filtering apparatus, etc.) may also be located on different nodes of a distributed system that implements the embodiments. For example, the present embodiments may be implemented using a cloud computing system that analyzes outgoing packets and filters incoming packets for a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for processing incoming network packets to an electronic device comprising a baseband processor and an application processor, the method comprising:
    inspecting, by the electronic device, an outgoing packet addressed to a destination device on a network;
    maintaining, by the electronic device, a list of accepted incoming packet attributes for the electronic device based at least in part on the inspecting, wherein the maintaining the list comprises analyzing header information for the outgoing packet, removing the header information from the list in response to the header information being associated with a closed socket pair, and adding the header information as one or more accepted incoming packet attributes to the list in response to the header information being associated with a new socket pair, and wherein the electronic device is further configured to stop analyzing the header information for the outgoing packet before all of the header information for the outgoing packet has been analyzed and begin analyzing header information for a next outgoing packet in response to the electronic device determining that the outgoing packet is not associated with the new socket pair or the closed socket pair;
    providing the list to the baseband processor;
    entering a sleep mode by the application processor; and
    filtering, by the baseband processor, the incoming network packets to the electronic device, wherein the filtering comprises discarding, without causing the application processor to exit the sleep mode, incoming network packets that do not include one or more of the accepted incoming packet attributes.

2. The method of claim 1, further comprising:
    maintaining the list based at least in part on a set of services associated with the incoming network packets received by the electronic device.

3. The method of claim 2, wherein the new socket pair is associated with at least one of:
    a new Transmission Control Protocol (TCP) connection; and
    a new User Datagram Protocol (UDP) port.

4. The method of claim 1, wherein the closed socket pair is associated with at least one of:
    a closed TCP connection;
    a protocol timeout; and
    a protocol reset.

5. The method of claim 1, wherein the providing the list to the baseband processor comprises:
    providing the list to the baseband processor prior to the application processor entering the sleep mode, wherein the baseband processor uses the list to prevent an unsolicited incoming packet from triggering an exit of the application processor from the sleep mode.

6. The method of claim 1, wherein the list comprises at least one of:
    a protocol;
    a source network address;
    a source port;
    a destination network address; and
    a destination port.

7. A method for processing incoming network packets to an electronic device with a baseband processor and an application processor, the method comprising:
    inspecting, by the baseband processor, an outgoing packet addressed to a destination device on a network;
    obtaining, by the baseband processor, a list of accepted incoming packet attributes for the electronic device, the list being maintained based at least in part on the inspecting, wherein the maintaining the list comprises analyzing a first set of header information for the outgoing packet, removing the first set of header information from the list in response to the first set of header information being associated with a closed socket pair, and adding the header information as one or more accepted incoming packet attributes to the list in response to the header information being associated with a new socket pair, and wherein the electronic device is further configured to stop analyzing the header information for the outgoing packet before all of the header information for the outgoing packet has been analyzed and begin analyzing header information for a next outgoing packet in response to the electronic device determining that the outgoing packet is not associated with the new socket pair or the closed socket pair;
    entering a sleep mode by the application processor;
    by the baseband processor:
        comparing a second set of header information for at least one of the incoming network packets to the list;
        in response to the second set of header information not being included in the list, discarding the at least one incoming network packet without causing the application processor to exit the sleep mode; and
        in response to the second set of header information being included in the list, causing the application processor to exit the sleep mode to process the at least one incoming network packet.

8. The method of claim 7, wherein the obtaining comprises:
    obtaining the list in response to the list being maintained based at least in part on outgoing packets from the electronic device; or
    obtaining the list prior to the application processor entering the sleep mode.

9. The method of claim 7, wherein the causing the application processor to exit the sleep mode to process the at least one incoming network packet comprises:
    providing the at least one incoming network packet to a transport-layer mechanism provided by the application processor for subsequent processing of the at least one incoming network packet by the transport-layer mechanism.

10. The method of claim 7, wherein the first and second sets of header information are associated with at least one of:
    an Internet Protocol (IP) header; and
    a transport protocol header.

11. The method of claim 7, wherein the list comprises at least one of:
    a protocol;
    a source network address;
    a source port;

a destination network address; and
a destination port.

12. An electronic device that processes incoming network packets, comprising:
an application processor;
a baseband processor; and
an analysis apparatus;
wherein the analysis apparatus is configured to inspect an outgoing packet addressed to a destination device on a network, and to maintain a list of accepted incoming packet attributes for the electronic device based at least in part on the inspection of the outgoing packet, wherein to maintain the list, the analysis apparatus is configured to analyze a second set of header information for the outgoing packet, remove the second set of header information from the list in response to the second set of header information being associated with a closed socket pair, and add the second set of header information as one or more accepted incoming packet attributes to the list in response to the second set of header information being associated with a new socket pair, and wherein the electronic device is further configured to stop analyzing the second set of header information for the outgoing packet before the entire second set of header information for the outgoing packet has been analyzed and begin analyzing a third set of header information for a next outgoing packet in response to the electronic device determining that the outgoing packet is not associated with the new socket pair or the closed socket pair;
wherein the application processor is configured to enter a sleep mode; and
wherein the baseband processor is configured to:
compare a first set of header information for at least one of the incoming network packets to the list;
in response to the first set of header information not being included in the list, discard the at least one incoming network packet without causing the application processor to exit the sleep mode; and
in response to the first set of header information being included in the list, causing the application processor to exit the sleep mode to process the at least one incoming network packet.

13. The electronic device of claim 12, wherein the analysis apparatus is further configured to:
maintain the list based at least in part on a set of services associated with the incoming network packets received by the electronic device.

14. The electronic device of claim 12, wherein the analysis apparatus is further configured to:
provide the list to the baseband processor for subsequent filtering of incoming network packets to the electronic device.

15. The electronic device of claim 14, wherein to provide the list to the baseband processor for subsequent filtering of incoming network packets to the electronic device, the analysis apparatus is configured to:
provide the list to the baseband processor prior to the application processor entering the sleep mode, wherein the baseband processor uses the list to prevent an unsolicited incoming packet from triggering an exit of the application processor from the sleep mode; and
cause the baseband processor to access the list while the list is maintained based at least in part on the outgoing packets.

16. The electronic device of claim 12, wherein to analyze the second set of header information for the outgoing packet from the electronic device, the analysis apparatus is configured to add the second set of header information as one or more accepted incoming packet attributes to the list in response to the second set of header information being associated with a new socket pair.

17. The electronic device of claim 12, wherein to cause the application processor to exit the sleep mode to process the at least one incoming network packet, the baseband processor is configured to provide the at least one incoming network packet to a transport-layer mechanism provided by the application processor for subsequent processing of the at least one incoming network packet by the transport-layer mechanism.

18. The electronic device of claim 12, wherein the header information is associated with at least one of:
an Internet Protocol (IP) header; and
a transport protocol header.

19. The electronic device of claim 12, wherein the list comprises at least one of:
a protocol;
a source network address;
a source port;
a destination network address; and
a destination port.

20. A non-transitory computer-readable storage medium storing instructions that, when executed by an electronic device with a baseband processor and an application processor, cause the electronic device to perform a method comprising:
inspecting an outgoing packet addressed to a destination device on a network;
maintaining a list of accepted incoming packet attributes for the electronic device based at least in part on the inspecting, wherein the maintaining the list comprises analyzing header information for the outgoing packet, removing the header information from the list in response to the header information being associated with a closed socket pair, and adding the header information as one or more accepted incoming packet attributes to the list in response to the header information being associated with a new socket pair, and wherein the electronic device is further configured to stop analyzing the header information for the outgoing packet before all of the header information for the outgoing packet has been analyzed and begin analyzing header information for a next outgoing packet in response to the electronic device determining that the outgoing packet is not associated with the new socket pair or the closed socket pair;
providing the list to the baseband processor;
entering a sleep mode by the application processor; and
filtering, by the baseband processor, the incoming network packets to the electronic device, wherein the filtering comprises discarding, without causing the application processor to exit the sleep mode, incoming network packets that do not include one or more of the accepted incoming packet attributes.

21. The non-transitory computer-readable storage medium of claim 20, the method further comprising:
maintaining the list based at least in part on a set of services associated with the incoming network packets on the electronic device.

22. The non-transitory computer-readable storage medium of claim 20, wherein the providing the list to the baseband processor comprises at least one of:
providing the list to the baseband processor prior to the application processor entering the sleep mode, wherein the baseband processor uses the list to prevent an unsolicited incoming packet from triggering an exit of the application processor from the sleep mode; and enabling the baseband processor access to the list while the list is maintained based at least in part on the outgoing packets.

23. The non-transitory computer-readable storage medium of claim 20, wherein the list comprises at least one of:
- a protocol;
- a source network address;
- a source port;
- a destination network address; and
- a destination port.

24. A method for processing incoming network packets, the method comprising:

analyzing, by an electronic device, header information for an outgoing packet addressed to a destination device on a network;

maintaining, by the electronic device, a list of accepted incoming packet attributes for the electronic device based at least in part on the analyzing, wherein the maintaining the list comprises removing the header information from the list in response to the header information being associated with a closed socket pair, and wherein the electronic device is configured to stop analyzing the header information for the outgoing packet before all of the header information has been analyzed and begin analyzing header information for a next outgoing packet in response to the electronic device determining that the outgoing packet is not associated with a new socket pair or the closed socket pair;

entering a sleep mode by an application processor included within the electronic device; and discarding, by the electronic device, incoming network packets that do not include one or more of the accepted incoming packet attributes, wherein the discarding occurs without causing the application processor to exit the sleep mode.

25. The method of claim 24, further comprising:
maintaining the list based at least in part on a set of services associated with the incoming network packets received by the electronic device.

26. The method of claim 24, further comprising:
providing the list to a baseband processor included within the electronic device; and
enabling access to the list by the baseband processor while the list is maintained based at least in part on the outgoing packets.

27. The method of claim 24, wherein the list comprises at least one of:
- a protocol;
- a source network address;
- a source port;
- a destination network address; and
- a destination port.

28. The method of claim 1, further comprising maintaining, by the electronic device, a second list of rejected incoming packet attributes for the electronic device based at least in part on the analyzing.

* * * * *